Figure 1:
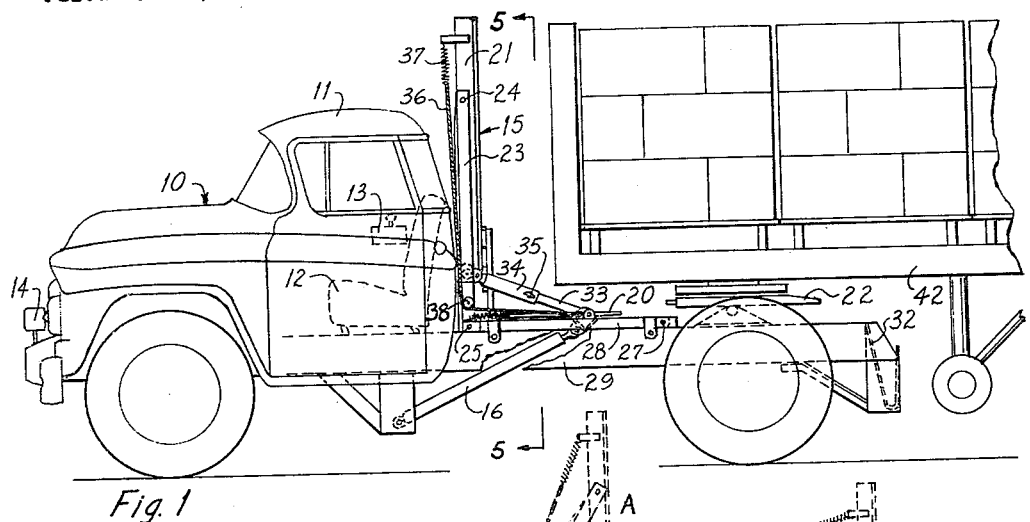

Sept. 18, 1962  J. F. PECK  3,054,522
TRACTOR LIFT COMBINATION
Filed Dec. 4, 1958  2 Sheets-Sheet 1

James Frank Peck
INVENTOR.

BY A. T. Sperry
ATTORNEY

James Frank Peck
INVENTOR.

BY A. T. Sperry
ATTORNEY

United States Patent Office 3,054,522
Patented Sept. 18, 1962

3,054,522
TRACTOR LIFT COMBINATION
James Frank Peck, Rte. 2, Winter Haven, Fla.
Filed Dec. 4, 1958, Ser. No. 778,237
6 Claims. (Cl. 214—674)

This invention relates to the combination with self-propelled roadway vehicles of a type known as trailer tractors, of a lift mechanism. More particularly, the invention is concerned with wheeled tractors for trailers or semi-trailers, frequently characterized by the provision of a trailer draft mechanism of the fifth wheel type constituting a horizontal plate for engagement by the forward end of a trailer, and a lift mechanism, such as a hydraulic fork lift, adapted to be instrumental in the loading and unloading of a trailer of the type adapted to be motivated by such tractor.

The invention is concerned with the mounting of a lift mechanism on a generally conventional type trailer tractor by means readily capable of selectively positioning the lift mechanism whereby it may be located, for non-use, in a position free of possible interference with the function of the tractor in drawing a trailer and whereby it may be selectively positioned, after disengagement of the trailer, in a position for lifting operations. An important feature of the invention is the provision for motivation of the lift, both in movements to and from operative position and in lifting, by the power plant of the tractor and of a control system by which the tractor and the lift may be manipulated by a single operator at a single control station.

Conversely stated, the invention is concerned with the combination with a generally conventional type of lift mechanism preferably of the hydraulic fork type, with a self-propelled vehicle adapted to engage and draw trailers over roadways. In further consideration of the present inventive concept it will be understood that the invention is primarily concerned with the provision of a generally conventional type of trailer tractor now commonly in use for the hauling of freight over long highway routes, in combination with a lift mechanism of the conventional hydraulic type including lifting forks such as are commonly employed in the lifting of palliatized materials.

It is, of course, recognized that hydraulic and mechanical hoists or lift mechanisms have long since been mounted on self-propelled vehicles, usually a special design of vehicle adapted solely for the mounting of the lift mechanism and for the transportation of lifted loads. It is also recognized that truck type vehicles have been provided with mechanical or hydraulic lift mechanisms by which a load presented to such vehicle may be lifted into position. However, applicant is not aware of any prior invention in which a trailer tractor has been provided with lift mechanism whereby, upon disengagement of the trailer, the tractor lift combination may function as a means for both lifting and conveying freight to and from such trailer, or in the general handling of material.

In that form of the present invention as here presented by way of example, the tractor is shown as of conventional form consisting of a self-propelled motor vehicle with power plant, steerable front wheels, rear traction wheels, and an open chassis extending beyond a driver's compartment which defines an operator's station with controls. The rear portion of the chassis supports a horizontally disposed fifth wheel in spaced relation to the rear of the operator's compartment to which the front end of a trailer may be secured and released. Such tractors are in common, widespread use and it is understood that the concept of the present invention does not involve details of construction of such tractor, except insofar as they may be modified for the mounting and power connection to control a lift mechanism.

Similarly, it will be understood that while the present disclosure presents a hydraulic lift mechanism of a conventional fork type as commonly used in the handling of freight, particularly freight in palliatized form, the invention is not concerned with the details of construction of the lift mechanism itself except insofar as such lift mechanism may be modified to conform with its mounting on a trailer tractor. It will, therefore, be understood that in the practice of the invention, the specific type of tractor is not critical nor is the construction and design of the lift mechanism. A wide variety of tractor structures, designs and power arrangements may be employed in the combination of the present invention and a likewise wide variety of lift mechanisms and power arrangements, therefore, may be combined with a trailer tractor without departure from the present inventive concept.

Figure 2:
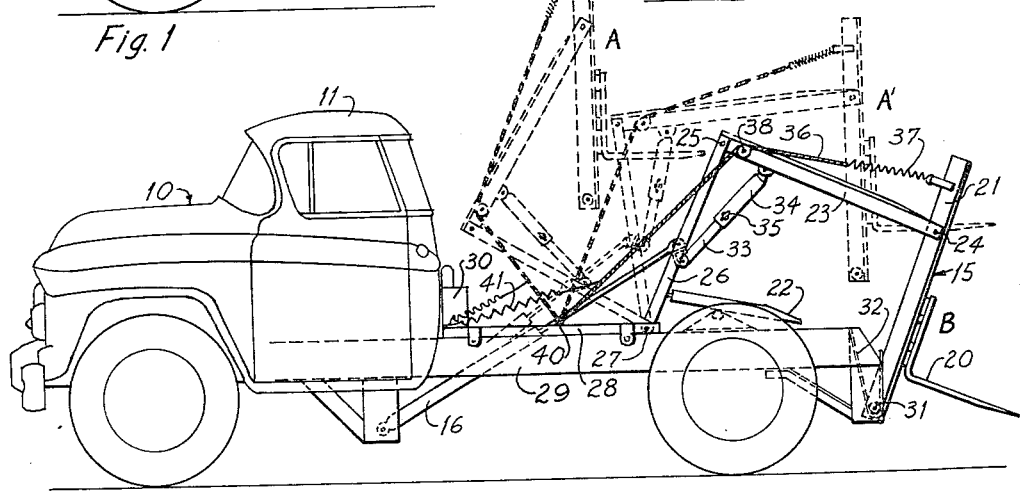
Figure 3:
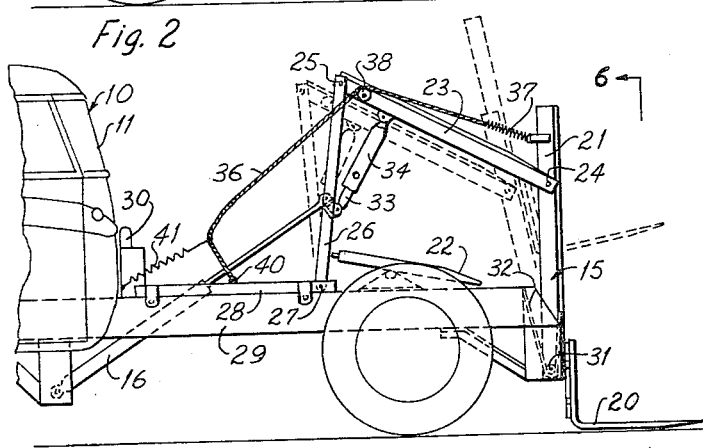
Figure 4:
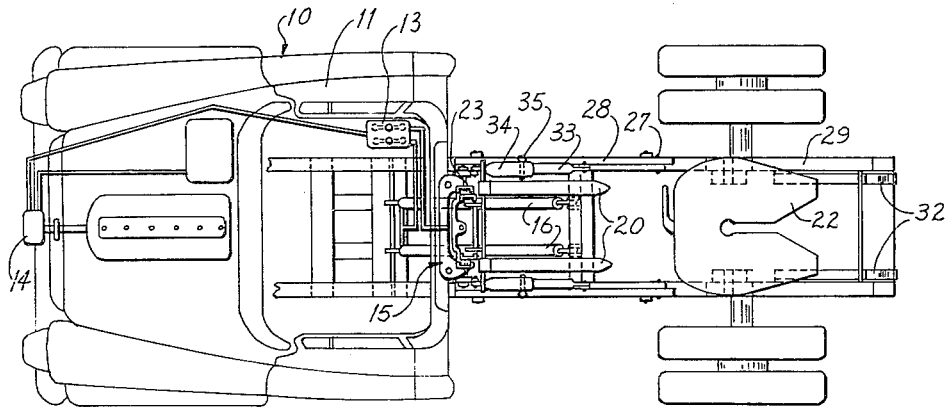
Figure 5:
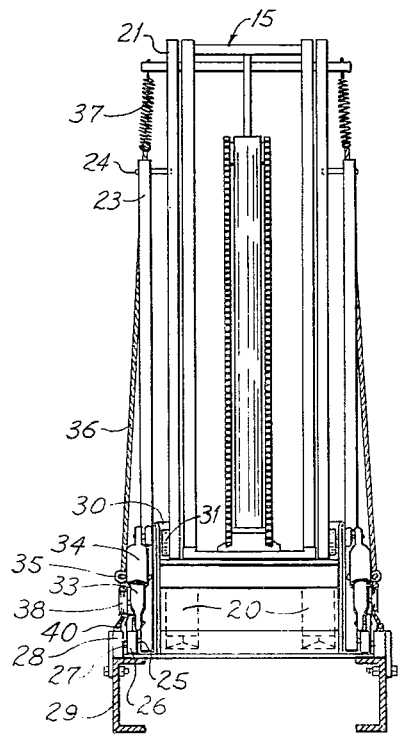
Figure 6:
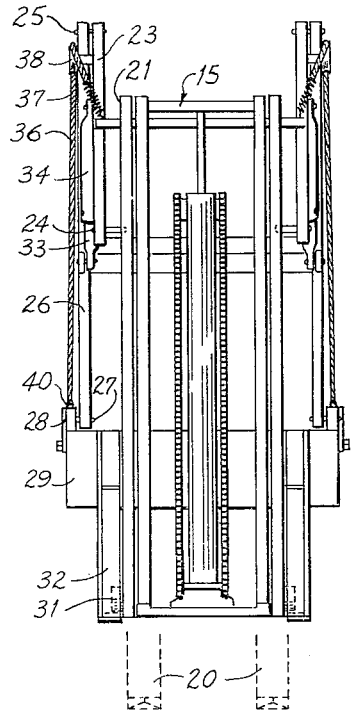

Thus it will be seen that it is among the primary objects of the present invention to provide a tractor for roadway vehicles of the trailer or semi-trailer type, which includes lift mechanism, preferably of a type adaptable to the manipulations of loads for the trailer conveyed by the tractor. In that form of the invention herein presented, the tractor is of a self-propelled, steerable, wheeled type having a power plant which is adapted to supply power for the actuation of the lift mechanism, not only in its lifting operation, but to motivate the lift mechanism from an inoperative position to an operative position. One feature of the invention is the provision of controls for the lift mechanism at the driver's position in the control zone of the tractor cab. Numerous other objects, features and advantages of the present invention will be apparent from a consideration of the accompanying drawings, in which FIGURE 1 is a side elevation of a tractor trailer combination showing the lift of the present invention in inoperative position while the tractor is used in drawing the trailer, FIGURE 2 is a similar side elevation with the trailer removed, showing the lift mechanism in dotted lines at "A" as it is being moved toward operative position. A second and further position of the lift mechanism in its travel to operative position is indicated by the dotted lines A¹. The full lines show the lift in position to be tilted for operation, FIGURE 3 is a fragmentary side elevation showing the lift mechanism in fully operative position, FIGURE 4 is a top plan view of the tractor combination of the present invention with the lift in retracted inoperative position, FIGURE 5 is a detail view taken on line 5—5 of FIGURE 1, illustrating the seating of the lift mechanism in inoperative position, and FIGURE 6 is a similar detail view taken on line 6—6 of FIGURE 3, showing the lift mechanism in its seated operative position.

In that form of the invention here shown by way of illustration, the wheeled, self-propelled, steerable tractor is generally indicated by the numeral 10, including a cab 11, having an operator's seat 12, defining a control zone provided with suitable control means indicated at 13, by which the power plant of the tractor (see FIGURE 4) may provide hydraulic power through a pump 14, to the conventional lift mechanism of the fork lift indicated at 15 and to the hydraulic, double acting cylinders 16, for lifting the hoist 15 to and from operative and inoperative position.

It will, of course, be understood that the tractor here shown is purely conventional and forms, of itself, no part of the present invention except in its combination with the lift mechanism 15. The lift mechanism also is purely conventional, here being shown as a hydraulic fork lift mechanism. Both the tractor and lift mechanism may be varied without departure from the present inventive concept which is directed to the combination of a tractor with a lift mechanism, the mounting and movement of the lift mechanism, and the operation of the lift mechanism by the power plant of the tractor and under the driver's control and from the driver's seat.

The lift mechanism of the present invention is shown as including a fork lift device 20, vertically slidable in the conventional side rails 21 through hydraulic lift mechanism. Since such devices are well known in the art the present disclosure does not deem necessary the inclusion of a detailed description of the specific lift mechanism illustrated. It is to be understood that such mechanism, while preferably hydraulic, may be mechanical if so desired. The normally vertical rails 21, in which the device 20 reciprocates in the raising and lowering operation, is selectively positional from the forward vertical position shown in FIGURE 1, where it is retained in advance of the fifth wheel 22 of the tractor to the rear operative position of FIGURE 3. Such movement is provided by a pair of transversely spaced parallel arms 23, pivotally engaged as at 24 with the normally vertical rails 21. The lower ends of the arms 23 are pivotally engaged as at 25 with companion transversely spaced parallel arms 26 pivotally mounted as at 27 on a fixed horizontal frame structure 28 mounted on the chassis 29 of the tractor.

For moving the lift mechanism 15 from its forward, vertical, inoperative position indicated in FIGURE 1, to the operative position of FIGURE 3, the hydraulic double acting cylinders 16 are supplied with fluid pressure from the pump 14. Such pressure moves the parallel links 26 from their horizontal position shown in FIGURE 1, in clockwise rotation as indicated by the movements of FIGURE 2, to swing the lift mechanism 15 upwardly and outwardly over the fifth wheel 22 and from the receiving rack 30 directly behind the cab 11 to an outwardly tilted position as indicated in FIGURE 2. In such position the pinions 31 of the lower end of the vertical beams 21 of the lift mechanism are received within a generally U-shaped guide 32, fixedly secured at the outer end of the chassis 29.

During such movement of the lift mechanism 15, the relationship of the normally horizontal arms 26 and the arms 23, are retained in fixed angularity by a slidable bolt 33 received within a cylinder 34 and secured against relative motion by securing pin 35, spring urges lift to position in guide 32 until pins 35 are withdrawn. After the lift mechanism has been moved to the outwardly slanting position shown in FIGURE 2, the pin 35 is withdrawn permitting the bolt 33 to slide in the cylinder 34 to erect the lift beams 21 into a vertical position (under the influence of a cable 36, tensioned by spring 37 and operating over pulley 38). The lower end 37 of the cable 36 is secured as at 40 to the chassis and is further restrained by a spring 41. Thus, upon retraction of the pin 35, the cylinders 16 may retract their pistons to erect the lift into the vertical position shown in FIGURE 3. Thus the lift may be conveyed by the tractor for lifting operations in the normal manner of such lift mechanism at any place desired. The tractor may also carry the lift with its load as desired as in the loading and unloading of the trailer.

It will be noted that the operating structure for moving the lift mechanism 15 to and from inoperative position before the fifth wheel 22 of the tractor and to the rear operative position, is a simple parallel pair of united and hingedly mounted arms. The pinions 31 of the lower end of the lift mechanism are received in the guide mechanism 30 for retaining the lift mechanism in vertically inoperative position before the fifth wheel and are received and guided in the U-shaped guide 32 when the lift is moved to the rear and vertical operative position. It will, of course, be understood that the cylinders 16 are double acting and are responsive to pressure applied by the pump 14 under the influence of the power plant of the tractor under the management of the controls 13 by the operator while in his normal seated position on seat 12. It will, of course, further be understood that the hydraulic lift mechanism for the fork 20 is operative by the same power through the pump 14 and under the influence of the controls 13. The lift mechanism is freely rockable on its pinions 31 when in operative position within suitable limits as is customary for loading and unloading operations.

The invention is not concerned with the specific structural details of either the tractor, lift mechanism or the trailer and it will be understood that in the practice of the invention, numerous changes, modifications and the full use of equivalents may be resorted to without departure from the spirit or scope of the present invention.

What I claim is:

1. The combination with a trailer tractor having a chassis and a horizontal fifth wheel engageable by a trailer mounted by said chassis, of a fork lift including vertical transversely spaced parallel side rails, a horizontal fork vertically movable on said side rails and pivotally mounted means for bodily moving said fork lift, while said rails are maintained in vertical position and said fork is maintained in horizontal position to and from an inoperative position with said rails disposed vertically forward of said fifth wheel and said fork parallel with said chassis and an operative position with said rails disposed vertically behind said chassis and said fork, parallel with said chassis.

2. The combination with a trailer tractor having a chassis, cab and a horizontal fifth wheel engageable by a trailer mounted by said chassis, of a fork lift including vertical transversely spaced parallel side rails, a horizontal fork vertically movable on said side rails and pivotally mounted means for bodily moving said fork lift, while said rails are maintained in vertical position and said fork is maintained in horizontal position to and from an inoperative position with said rails disposed vertically forward of said fifth wheel and said fork parallel with said chassis and an operative position with said rails disposed vertically behind said chassis and said fork parallel with said chassis, and a controller in said cab for remotely controlling power means for actuating said pivotally mounted means.

3. The combination with a trailer tractor having a chassis and a horizontal fifth wheel engageable by a trailer mounted by said chassis, of a fork lift including vertical transversely spaced parallel side rails, a fork vertically movable on said side rails and horizontally pivotally mounted means for moving said fork lift, including said rails and fork to and from an inoperative position with said rails disposed vertically forward of said fifth wheel and said fork parallel with said chassis and an operative position with said rails disposed vertically behind said chassis and said fork, parallel with said chassis, said means being pivoted with respect to said chassis and including arms for maintaining a generally vertical position of said side rails through the movement of said fork lift throughout its movement to and from operative and inoperative movement.

4. The combination with a trailer tractor having a chassis and a horizontal fifth wheel engageable by a trailer mounted by said chassis, of a fork lift including vertical transversely spaced parallel side rails, a fork vertically movable on said side rails and horizontally pivotally mounted means for moving said fork lift, including said rails and fork to and from an inoperative position with said rails disposed vertically forward of said fifth wheel and said fork parallel with said chassis and an operative position with said rails disposed vertically behind said chassis and said fork, parallel with said chassis, said means being pivoted with respect to said chassis and including arms for maintaining a generally vertical position of said side rails through the movement of said fork lift throughout its movement to and from operative and inoperative movement, said chassis including a rack forward of said fifth wheel to receive and secure said fork lift in inoperative position, and a guide at the rear of said chassis to receive said fork lift when in operative position.

5. The combination with a trailer tractor, including a chassis and a horizontal trailer engaging fifth wheel mounted on said chassis of a fork lift mechanism, including side rails and a fork slidable with respect thereto and means pivotally mounted horizontally on said chassis forwardly of said fifth wheel for moving said fork lift, including rails and fork to and from an inoperative position forwardly of said fifth wheel and an operative position rearwardly of said tractor, said means including two pair of parallel spaced arms pivotally inter-connected, one end of one pair of said arms engaging said fork lift while one end of the other pair of arms is pivotally mounted with respect to said chassis forwardly of said fifth wheel.

6. The combination with a trailer tractor, including a chassis and a horizontal trailer engaging fifth wheel mounted on said chassis of a fork lift mechanism, including side rails and a fork slidable with respect thereto and means pivotally mounted horizontally on said chassis forwardly of said fifth wheel for moving said fork lift, including rails and fork to and from an inoperative position forwardly of said fifth wheel and an operative position rearwardly of said tractor, said means including two pair of parallel spaced arms pivotally inter-connected, one end of one pair of said arms engaging said fork lift while one end of the other pair of arms is pivotally mounted with respect to said chassis forwardly of said fifth wheel, and hydraulic remotely controlled piston and cylinder means for actuating said means pivotally mounted.

References Cited in the file of this patent

UNITED STATES PATENTS

| | | |
|---|---|---|
| 2,345,789 | Brooks | Apr. 4, 1944 |
| 2,501,112 | Webster | Mar. 21, 1950 |
| 2,601,170 | Retzloff | June 17, 1952 |
| 2,656,058 | Foote | Oct. 20, 1953 |
| 2,672,990 | Sundin | Mar. 23, 1954 |
| 2,682,957 | Holmes | July 6, 1954 |
| 2,794,557 | Vero | June 4, 1957 |
| 2,867,451 | Repke | Jan. 6, 1959 |
| 2,910,203 | Todd | Oct. 27, 1959 |